J. W. SIMMONS.
AUTOMOBILE BUMPER.
APPLICATION FILED OCT. 8, 1920.
1,369,561.  Patented Feb. 22, 1921.
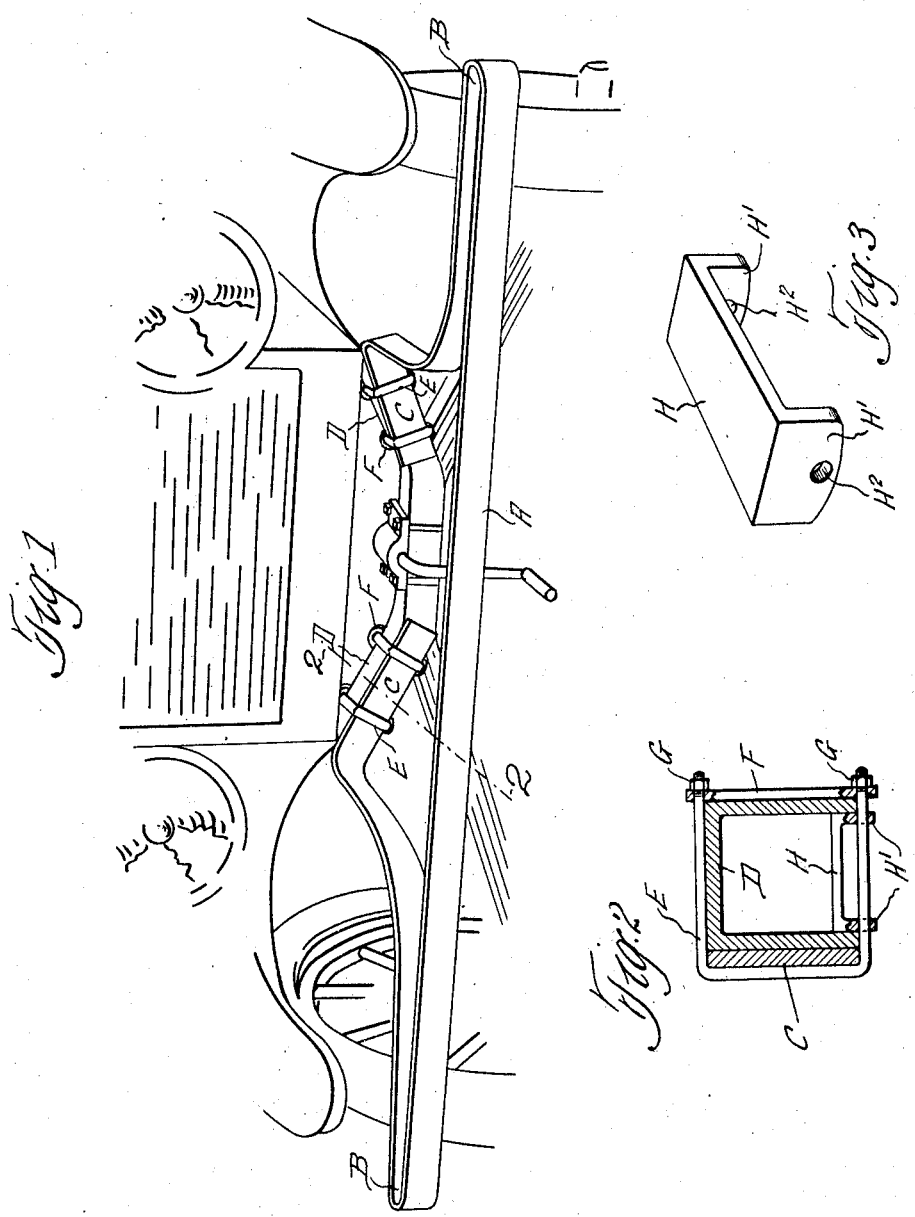
Inventor
J. W Simmons
By
Hull Smith Brock & West
Attys.

UNITED STATES PATENT OFFICE.

JOHN W. SIMMONS, OF CLEVELAND, OHIO.

AUTOMOBILE-BUMPER.

1,369,561.     Specification of Letters Patent.     Patented Feb. 22, 1921.

Application filed October 8, 1920. Serial No. 415,494.

*To all whom it may concern:*

Be it known that I, JOHN W. SIMMONS, a citizen of the United States, residing at Cleveland, in the county of Cuyahoga and State of Ohio, have invented a certain new and useful Improvement in Automobile-Bumpers, of which the following is a full, clear, and exact description, reference being had to the accompanying drawings.

This invention relates generally to automobile bumpers and more particularly to the manner of connecting the same to the frame of the automobile, and while the invention is particularly adapted for the connection of automobile bumpers to the Ford car, the principle thereof can be applied to other cars involving similar structures. The object of the invention consists in the novel features of connection and combination hereinafter fully described and set forth in the claims.

In the drawings forming a part of this specification, Figure 1 is a view showing the practical application of my invention; Fig. 2 is a detail vertical section on the line 2—2 of Fig. 1; and Fig. 3 is a detail perspective view of a strengthening filler.

Referring to the drawings, A indicates a one-piece bumper folded upon itself at B and provided with inwardly and downwardly inclined end portions C which are coextensive in area with the converging portions D of the frame of the automobile, and these inclined and converging ends C are securely fastened to the inclined and converging portions of the automobile frame by means of the shackles or clips E passing around the end of the bumper and the frame member of the automobile, the rear ends of the shackle or clip being passed through a clip plate F, arranged from the rear side of the frame member and nuts G are employed to complete the connection. The frame member D is a channel member open at the bottom, and in order to prevent the compression or springing of the vertical walls of said member, I provide a metallic brace or filling member H of a length to fit snugly within the open end of the frame member and having depending ears $H^1$, provided with apertures $H^2$, which apertures are just below the lower edge of the frame member so that the lower arm of the shackle or clip can pass through said apertures, thus positioning the brace or filling member within the frame member and preventing the collapsing or springing of the vertical walls when the clips are tightened sufficiently to securely fasten the ends of the bumper to the frame member. The brace or filling member H may be of pressed sheet metal or cast or forged metal as preferred, so long as the required strength resides in the said brace or filling member. The automobile bumper is preferably made from a single piece of metal, shaped as shown, and therefore capable of quick and easy attachment to the automobile frame, and the ends of the bumper being inclined and converging and rigidly connected to the inclined and converging portions of the frame member will be held securely in position and all tendency to shift either vertically or horizontally avoided.

Having thus described my invention what I claim is:

1. An automobile bumper having inclined converging inner ends, in combination with inclined and converging frame members, clips surrounding said frame members and bumper ends, and means contained within the frame members to prevent collapse of the same.

2. The combination with a channeled frame member, of a bumper end arranged upon one side of said member, a clip surrounding said bumper end and frame member and a filler arranged in the channeled frame member.

3. The combination with a channeled frame member, of a bumper end arranged upon one side of said frame member, a filler arranged within the channeled frame member and a clip for securing the bumper end to the frame member and positioning the filler within the frame member.

4. The combination with a channeled frame member, of a bumper end arranged upon one side of said frame member, a filler having depending apertured ears arranged within the frame member and clips passing around said bumper end and frame member and through the depending ears of the filler for the purpose specified.

5. An automobile bumper having inclined converging inner ends, in combination with inclined and converging frame members, said bumper ends contacting with the vertical faces of said frame members and clips surrounding said frame members and bumper ends.

In testimony whereof, I hereunto affix my signature.

JOHN W. SIMMONS.